United States Patent
Liu et al.

(10) Patent No.: US 7,609,826 B2
(45) Date of Patent: Oct. 27, 2009

(54) SYSTEM AND METHOD FOR PREPARING TELECOMMUNICATIONS CALL RECORD DATA FOR QUANTITATIVE ANALYSIS

(75) Inventors: Angela Shau-han Liu, San Francisco, CA (US); Jeremy Y. Ho, Roseville, CA (US); William A. Samples, Baltimore, MD (US); Allan T. Kerr, Leawood, KS (US); Michelle M. Tompkins, Thornton, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1007 days.

(21) Appl. No.: 11/186,513

(22) Filed: Jul. 21, 2005

(65) Prior Publication Data

US 2006/0045251 A1  Mar. 2, 2006

Related U.S. Application Data

(63) Continuation-in-part of application No. 10/924,886, filed on Aug. 25, 2004, now Pat. No. 7,424,103.

(51) Int. Cl.
 *H04M 15/00* (2006.01)
(52) U.S. Cl. ............. 379/126; 379/114.14; 379/121.01; 379/127.02; 379/145
(58) Field of Classification Search .............. 379/111, 379/112.01, 114.05, 114.28, 115.01, 115.02, 379/121.01, 121.05, 126, 127.01, 127.02
See application file for complete search history.

(56) References Cited

U.S. PATENT DOCUMENTS

| | | | |
|---|---|---|---|
| 6,356,628 B1 * | 3/2002 | Burke et al. | 379/112.06 |
| 6,694,001 B1 | 2/2004 | Lampell et al. | |
| 6,721,405 B1 | 4/2004 | Nolting et al. | |
| 6,891,938 B1 * | 5/2005 | Scott et al. | 379/112.06 |
| 7,043,001 B2 | 5/2006 | Moisey et al. | |
| 7,388,948 B2 * | 6/2008 | Armanino et al. | 379/126 |
| 2003/0118169 A1 | 6/2003 | Savoor et al. | |
| 2004/0161084 A1 * | 8/2004 | Lampell et al. | 379/111 |
| 2005/0084090 A1 * | 4/2005 | Moisey et al. | 379/221.01 |
| 2005/0088974 A1 | 4/2005 | Savoor et al. | |
| 2005/0276403 A1 * | 12/2005 | Armanino et al. | 379/126 |
| 2006/0045248 A1 * | 3/2006 | Kernohan et al. | 379/126 |
| 2006/0045251 A1 | 3/2006 | Liu et al. | |
| 2008/0063164 A1 * | 3/2008 | Armanino et al. | 379/126 |

* cited by examiner

*Primary Examiner*—Binh K Tieu

(57) ABSTRACT

A system and method for processing gathered call data from a network monitoring system to prepare the call data for analyzing call routing across a network, not limited to call data associated with the transit portion of a call path. The system and method include correlating call data to form a correlated set, ordering the call data in the correlated set to form a compound CDR, and enriching the compound CDR by comparing CDRs within the compound CDR to each other.

23 Claims, 10 Drawing Sheets

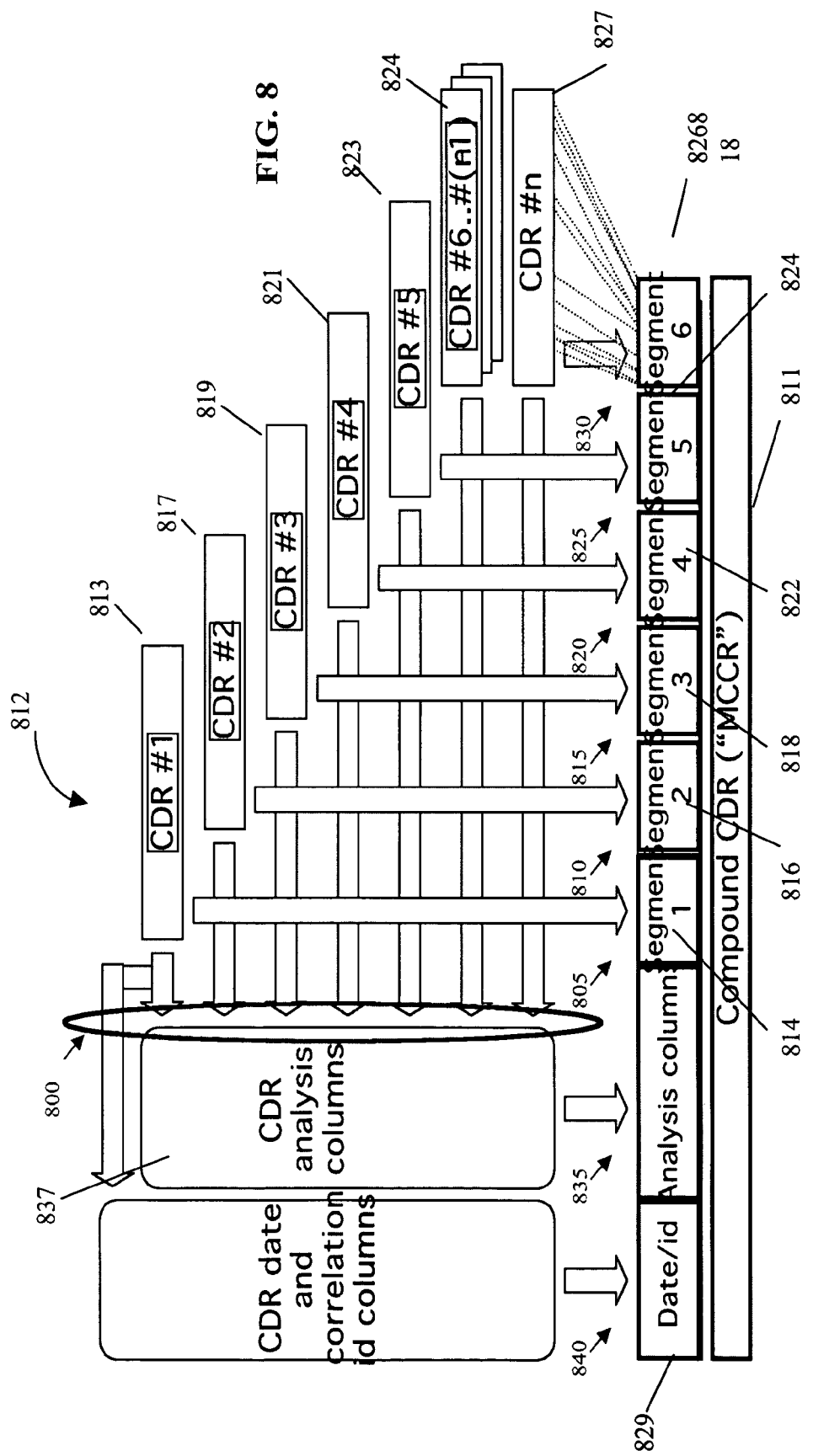

SYSTEM AND METHOD FOR PREPARING TELECOMMUNICATIONS CALL RECORD DATA FOR QUANTITATIVE ANALYSIS

CROSS REFERENCE TO RELATED APPLICATIONS

The present application is a continuation-in-part of U.S. patent application Ser. No. 10/924,886, filed Aug. 25, 2004 now U.S. Pat. No. 7,424,103, entitled A METHOD OF TELECOMMUNICATIONS CALL RECORD CORRELATION PROVIDING A BASIS FOR QUANTITATIVE ANALYSIS OF TELECOMMUNICATIONS CALL TRAFFIC ROUTING which is incorporated herein by reference.

BACKGROUND OF THE INVENTION

The present invention relates generally to telephone systems and, more particularly, to a method of call record correlation in a telecommunications system. Most particularly, the present invention relates to a method of compound call record creation based on the call record correlation.

In general, the following definitions are common in the telephone industry, but are included herein for completeness and clarity of explanation.

Access Traffic

A compensation mechanism governed by tariffs and/or contracts for message traffic carried by interexchange carriers (IXC) and exchanged between the IXCs and local exchange carriers (LECs), independent local exchange carrier (ILECs), and competitive local exchange carrier (CLECs). This type of traffic is generally carried over a type of telephone trunk called a Feature Group D trunk or FG-D trunk, and typically carries the highest per-minute charge. Under access traffic, IXCs pay the other carriers for each Minute of Use (MOU) of traffic destined to the IXC or originating from the IXC.

Address Complete Message (ACM)

The ACM is used to acknowledge receipt of an initial address message (IAM) and to indicate that the called party is being alerted (e.g. via ringing).

ACM Timestamp

The time at which the telephone being called began alerting the user (e.g. ringing).

Answer Message (ANM)

The ANM is used to indicate that the user called has answered, end-to-end connection is established, and a conversation takes place.

ANM Timestamp

The time the operator of the telephone being called answered the telephone.

Arbitrage

As used herein and as commonly used in the telephone industry, it is the mis-routing of inter-carrier telephone calls in such a way as to violate existing regulatory tariffs and/or established inter-carrier contracts. The purpose of such mis-routing is typically to take advantage of lower rates associated with the delivery of telephone traffic via routes other than those established and required by such tariffs and contracts and as such may be fraudulent. Arbitrage typically occurs via the following techniques: (1) IXC access traffic delivered via CLECs and (2) transit traffic delivered via non-transit trunks. However, there are many other ways in which arbitrage can occur.

Backward Interwork Parameter

An indicator as to whether Signaling System 7 (SS7) and non-SS7 inter-working was encountered ahead of this point in the call.

Call Detail Record (CDR)

A collection of messages including parameters associated with each call which provide detail regarding the call origin, destination, and other details. Such CDRs typically include, for example, time stamping, calling party number, called party number and many more fields.

Called Number

The telephone number dialed by the calling user.

Calling Number

The telephone number of the user making the call.

Carrier Identification Code (CIC)

Parameters contained within the SS7 IAM message which can be used to identify the requested IXC.

CIC Parameter

The number identifying the IXC selected by the LEC.

Charge Number

The telephone number to which the call is charged. Typically it is the telephone number of the calling telephone.

Competitive Local Exchange Carriers (CLEC)

A LEC but specifically referring to one that competes with the incumbent LEC.

Destination Point Code (DPC)

The SS7 node, e.g. switching office or Signaling Transfer Point (STP), that the message is being sent to.

End Office (EO)

A switching office normally referred to as an EO to which telephones (from homes or businesses) are connected via wires called "loops".

Feature Group D Trunk (FG-D Trunk)

A type of telephone trunk. See Access Traffic.

Forward Interwork Parameter

An indicator as to whether SS7 and non-SS7 inter-working was encountered prior to the point in the call where the parameter is observed.

Independent Local Exchange Carriers (ILEC)

Generally refers to a LEC which co-existed with a local exchange carrier owned by the Regional Bell Operating Companies (RBOCs).

Initial Address Message (IAM)

The IAM is used to indicate the desire to set up a call. A trunk is seized and "reserved" for use in the call.

IAM Timestamp

The time the trunk was seized for transmission of an SS7 message.

Interconnect Carrier

Any carrier that interconnects with the LEC.

Interexchange Carriers (IXC)

An IXC transports calls from one LEC to another, or possibly the same LEC, throughout the IXC's serving area. The IXC's serving area would typically span more than one local access transport area (LATA), and the IXC receives messages from and delivers messages to local exchange carriers (LECs, CLECs, and ILECs) and other IXCs. Calls that span LATAs typically must use an IXC.

IXC Trunk
A trunk that comes from an IXC to a LEC.

Jurisdiction Indicator Parameter
A parameter contained in SS7 messages which, if available, indicates the geographic origin of a call.

Link Monitoring System (LMS)
A system that can be used to collect CDRs by monitoring SS7 links.

Local Access Transport Area (LATA)
The geographic area, determined at divestiture, within which a LEC provides service is typically divided into various areas referred to as LATAs.

Local Exchange Carrier (LEC)
A LEC is a telephone service provider that provides telephone service to its customers in a specific geographical serving area. A LEC would typically be a local telephone company.

Local Exchange Routing Guide (LERG)
A document defining the specific LATA within which a given telephone number is located.

Location Routing Number (LRN)
A number obtained from the database at the service control point (SCP). The SCP converts the called number into the LRN which is the number used by the network to get the call to its final destination.

Loop
Telephones are connected (from homes or businesses) via wires called "loops" to a switching office normally referred to as an EO.

Meet-Point Billing
Traffic exchanged between IXCs and ILECs destined for LEC customers (in cases where the IXC does not directly interconnect with the LEC) is governed by tariffs and/or contracts, using a compensation mechanism referred to as meet-point billing. Under meet-point billing, IXCs pay the ILEC a fee, part of which is subsequently paid by the ILEC to the LEC for each MOU of traffic between the IXC and the LEC.

Minute of Use (MOU)
For billing purposes a measure of the time which a given carrier's resources are consumed providing a given service.

Numbering Plan Address (NPA)
More commonly known as the area code of the telephone number.

NPANXX
The NPA plus the next three digits of the telephone number.

Originating Point Code (OPC)
The SS7 node, e.g. switching office or STP, that is sending the message.

Reciprocal Compensation
Under reciprocal compensation, carriers pay each other a usage fee for each MOU of traffic delivered from their network to the other carrier's network. This message traffic is typically traffic exchanged between various LECs and their CLECs and ILECs. This type of traffic is generally carried over a type of telephone trunk called a local trunk.

Release Complete Message (RLC)
The RLC is sent when the second of the two connected parties hangs up. At that point the trunk is released.

RLC Timestamp
The time the operator of the second telephone to hang up did so.

Release Message (REL)
The REL indicates that the first of the two connected parties has hung up.

REL Timestamp
The time the operator of the first telephone to hang up did so.

Remote Site Processors
A device used to consolidate partial CDRs into complete CDR's.

Service Control Point (SCP)
A network database used to translate called numbers into local routing number which translates the called number in the location routing number (LRN).

Signaling Transfer Points (STPs)
At the heart of the SS7 network are packet switches known as STPs. STPs are deployed in pairs in the North American SS7 network to provide communication path redundancy. Different carriers own a portion of the SS7 network and interconnect their EOs and tandems to the overall SS7 network so as to enable end-to-end communication between carriers.

SS7 Links
The communication links over which SS7 traffic is carried.

SS7 Network
The SS7 messages are transported over a secure data network referred to as the "SS7 network". The SS7 network comprises various SS7 Links along with STPs.

SS7 Protocol
To perform the task of call setup and tear down when multiple end offices EOs are involved, switching offices communicate with each other using a signaling protocol referred to as SS7, carried over SS7 links. SS7 messages are used in specific sequences to perform various tasks required to establish telephone connections. Telephone calls between two customers connected to the same EO will be handled by the application logic contained in the EO, and will not require the use of the SS7 protocol.

Tandem
In certain cases, for example two towns that are somewhat far apart, a type of switching center called a "tandem" is involved in establishing connectivity between two customers.

Trunk Circuit Identification Code (TCIC)
Between any two telephone switches there may a trunk group which comprises several trunks. These trunks are identified via the TCIC.

Transit Network Selection (TNS)
Parameters contained within the SS7 IAM message which can be used to identify the requested IXC.

Transit Traffic
Traffic that goes thru a LEC network but does not originate or terminate in that LEC and uses trunks other than those specifically designated for such traffic.

Trunk
When telephones are served from different EO's (e.g. in different towns), they are interconnected via wires called "trunks" between the EO's.

Unbundled Network Elements (UNE)

UNEs are a requirement mandated by the Telecommunications Act of 1996. They are the parts of the network that the ILECs are required to offer on an unbundled basis. Together, these parts make up a loop that connects to a Digital Subscriber Line Access Multiplexer (DSLAM) or a voice switch (or both). The loop allows non-facilities-based telecommunications providers to deliver service without laying network infrastructure (copper/fiber).

UNE-Platform (UNE-P)

UNE-P is a combination of UNEs (loop+port is SBC's definition, port involves switching which is bought per minute at a "cost" rate from the RBOCs) that allow end-to-end service delivery without ANY facilities. Despite not involving any CLEC facilities, it still requires facilities-based certification from the Public Utilities Commission (PUC) to deliver services via UNE-P.

Wide Area Network (WAN)

A communication network serving a large geographical area of interest.

In the telephone system, complex regulatory tariffs have been mandated and/or inter-carrier contracts have been negotiated between carriers which (a) regulate the way in which traffic is to be routed between them and (b) specify the rates at which various types of traffic are to be charged. It is often of financial advantage to mis-route calls in violation of these existing regulatory tariffs and/or established inter-carrier contracts. The common name for this manipulation is "arbitrage". The intent of those perpetrating this mis-routing is to take advantage of lower rates associated with the delivery of telephone traffic via other than the proper routes. Confirming the presence of arbitrage and proper billing is often difficult due to the fact that call routing information is often missing or incomplete.

Previous methods for the determination of telephone traffic routing have been based upon a single call sample, e.g. a call record obtained at the point where the call originates or at the point where the call terminates. The information available within a single call record has limitations due to the fact that critical routing information may be (a) missing or (b) incorrect. These techniques have proven to be ineffective at determining the presence of arbitrage. Since in typical arbitrage situations, the local exchange carrier bills the interexchange carriers, there is a great financial incentive for the local exchange carrier to detect and stop arbitrage. Furthermore, since previous methods are both unreliable and labor intensive, there is a great need to improve manners for detecting arbitrage.

With respect to the overall problem of analyzing call routing, it is difficult to analyze call routing when call records are created for each individual call segment only. One possible solution is to produce multi-leg call records (referred to herein as consolidated call records (CCRs)) for calls that transit a monitored network. This is done by analyzing individual CDRs created by a network monitoring system where individual CDRs are created for each observed segment of the call. Disadvantages of this solution include: (a) CCRs are only created for calls that transit the monitored network and the solution only considers CDRs that are in regards to the transit part of the call path; and (b) the created CCR does not maintain the individual fields of the contributing CDRs, instead it includes information from the first and last relevant CDRs only. Another possible solution is a script that joins two CDRs into a single record for a single call. The disadvantage of this solution is that it only considers two CDRs.

A system and method are needed that identify arbitrage through a correlation process. Further, a system and method are needed that provide the aggregation of multiple CDRs, each pertaining to a given segment of the same call, into one compound call record while maintaining key parameters from each contributing CDR, the system and method relying on the correlation process of the present invention, or any other correlation process. Also, a system and method are needed to enrich the resulting compound CDR with analysis flags that compare parameters from one contributing CDR to another, providing analysts more information regarding the call.

SUMMARY OF THE INVENTION

The problems set forth above as well as further and other problems are resolved by the present invention. The solutions and advantages of the present invention are achieved by the illustrative embodiments and methods described herein below.

According to an aspect of the present invention, there is provided a method of identifying arbitrage including (a) determining whether originating and terminating CDRs are correlated and obtaining correlated candidate pairs from the determined CDRs; (b) establishing whether a correlated candidate pair of the obtained correlated candidate pairs is a unique pair; (c) and if established that a correlated candidate pair is unique, determining an amount of arbitrage based on the unique correlated candidate pair.

According to another aspect of the present invention, there is provided a method of identifying arbitrage and routing anomalies including (a) obtaining a plurality of originating CDRs from call data having a known route to a destination within a monitored network; (b) obtaining a plurality of terminating CDRs from the call data; (c) establishing whether the plurality of originating CDRs and the plurality of terminating CDRs are correlated candidate pairs based on uniquely originating and terminating CDRs having related call timings and called information; (d) if established that the plurality of originating and terminating CDRs are uniquely correlated, comparing fields of the originating and terminating CDRs to thereby determine an amount of arbitrage.

According to another aspect of the present invention, there is provided method of identifying arbitrage and routing anomalies including (a) establishing whether a plurality of originating and terminating CDRs are correlated based on originating and terminating CDR pairs and obtaining a plurality of correlated candidate pairs; (b) obtaining unique CDR pairs from the plurality of correlated candidate pairs and determining an amount of arbitrage based on the unique CDR pairs.

According to another aspect of the present invention, there is provided method of (a) identifying all call records of a correlation set created from, for example, the correlation process described herein or, for example, the correlation process described in U.S. Pat. No. 6,694,001; (b) sorting the call records by increasing timestamps; (c) concatenating elements of the various correlated call records into a unique compound call record; and (d) enriching the compound call record with additional calculated attributes. One advantage of this aspect of the present invention is that it includes the ability to represent a call using all gathered CDRs from a network monitoring system, not simply those associated with the transit portion of a call path. Another advantage of this aspect of the present invention is the creation of compound CDRs for all instances where correlated CDRs are identified, not simple transit calls. A still further advantage of this aspect of the present invention is the inclusion of parameters from all associated CDRs of interest, not simply from end points.

Additional aspects and advantages of the present invention will become apparent from the following detailed description, taken in conjunction with the accompanying drawings, illustrating by way of example the principles of the invention.

DESCRIPTION OF THE SEVERAL VIEWS OF THE DRAWING

These and/or other aspects and advantages of the invention will become apparent and more readily appreciated from the following description of the embodiments, taken in conjunction with the accompanying drawings of which:

FIG. 8 is a diagram illustrating the construct of a compound call record according to an aspect of the present invention.

DETAILED DESCRIPTION OF THE INVENTION

Figure 1A:
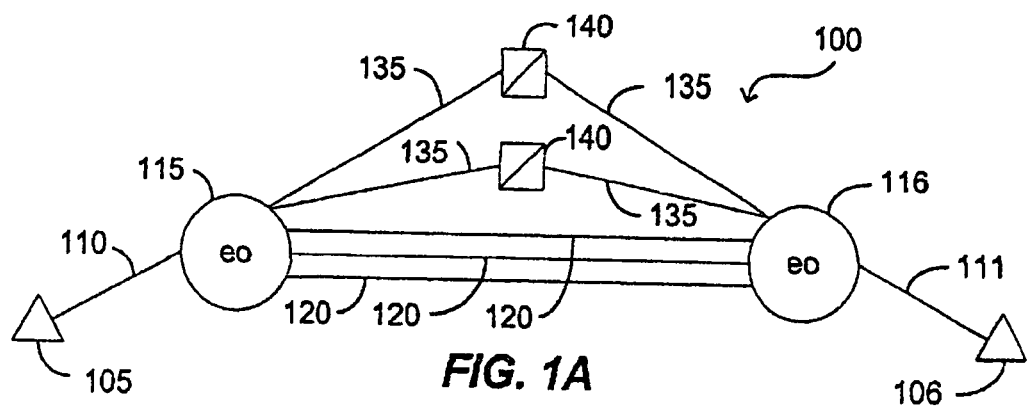
FIG. 1A is a diagram of a communication system according to an aspect of the present invention.

The present invention provides a novel method for the correlation of calls and for the detection of mis-routing of traffic in a communication system thus preventing arbitrage, and for network routing management.

Correlation of CDRs obtained from various communication segments provides the ability to mutually enrich the records so as to increase billing accuracy as well as to enhance the detection of call mis-routing. Providing the aggregation of multiple CDRs into one compound call record while maintaining key parameters from each contributing CDR assists in analyzing call routing when CDRs are created for each individual call segment only.

Techniques disclosed in the present invention can be used to identify inter-carrier telephone calls that are being mis-routed in such a way as to violate existing regulatory tariffs and/or established inter-carrier contracts. The common name for this manipulation is "arbitrage", and the intent of the perpetrators is to take advantage of lower rates associated with the delivery of telephone traffic via routes other than those legislated or contracted. Through the process of correlation in representative embodiments, various call "legs" associated with the same call can be identified, and a more accurate "compound" call record can be made that incorporates call routing information obtained from the individual call legs.

CDRs are collected throughout the LEC footprint and "correlated" at the time of their load into a CDR database. The correlation method of the present invention comprises identifying call segments via CDRs wherein (1) the called station numbers are identical and (2) the time of call initiation and the time the first party hangs up match within a configurable, but very small, time difference. Other correlation methods can be used to analyze call routing when CDRs are created for each individual call segment only, for example the correlation method set forth in U.S. Pat. No. 6,694,001.

With respect to the correlation method of the present invention, in order to eliminate false correlations (i.e., to disassociate call segments that really are not related to the same call), attempts are made to increase the correlation confidence by correlating other pieces of call setup information from the various call segments. Specifically, further efforts can be made to (1) confirm that the time the connection for the call was completed matches within a configurable, but very small, time difference, (2) insuring that the calling number information parameters match, (3) insuring that charge number information parameters match, and/or (4) insuring that jurisdiction information parameters match.

Additional constraints can be applied to select calls that fit the criteria of arbitrage, and to exclude calls that may be correlated for other legitimate reasons or duplicate call segments that may have been collected due to over-provisioning of the link monitoring systems.

Correlation of CDRs obtained from various communication segments provides the ability to mutually enrich the records so as to increase billing accuracy as well as to enhance the detection of call mis-routing. In the following detailed description and in the several figures of the drawings, like elements are identified with like reference numerals.

Through the process of correlation in representative embodiments, various call "legs" associated with the same call can be identified, and a more accurate "compound" call record can be made that incorporates call routing information obtained from the individual call legs. Other techniques disclosed herein can be used to correlate CDRs created in one part of the network with CDRs created in another part. Such techniques have application in calling traffic, detection of call mis-routing, call billing, and analyzing call routing.

A LEC operates in and serves individual telephone subscribers in a specific geographical serving area. The serving area is typically divided into LATAs. The LEC interconnects to CLECs, ILECs and IXCs throughout its serving area.

Traffic exchanged between IXCs and LECs/ILECs/CLECs is governed by tariffs and/or contracts, using a compensation mechanism referred to as access traffic. Under access traffic, IXCs pay the other carriers for each MOU of traffic destined to the IXC or originating from the IXC. This type of traffic is generally carried over a type of telephone trunk called a Feature Group D trunk or FG-D trunk, and typically carries the highest per-minute charge.

Traffic exchanged between CLECs and LECs and between ILECs and LECs is typically governed by tariffs and/or contracts, using a compensation mechanism referred to as reciprocal compensation. Under reciprocal compensation, carriers pay each other a usage fee for each MOU of traffic delivered from their network to the other carrier's network. This type of traffic is generally carried over a type of telephone trunk called a local trunk.

Traffic exchanged between IXCs and ILECs destined to LEC customers (in cases where the IXC does not directly interconnect with the LEC) is governed by tariffs and/or contracts, using a compensation mechanism referred to as meet-point billing. Under meet-point billing, IXCs pay the ILEC a fee, part of which is subsequently paid by the ILEC to the LEC for each MOU of traffic between the IXC and the LEC.

Telephones are connected (from homes or businesses) via wires called "loops" to a switching office normally referred to as an EO. Telephone calls between two customers served by the same EO are handled by the application logic contained in the EO and do not require the use of the SS7 protocol described in the following.

When telephones are served from different EOs (e.g. in different towns), they must be interconnected via wires called "trunks" between the EOs. This type of telephone call requires inter-office coordination, usually via a networking protocol called SS7.

In certain cases, for example two towns that are somewhat far apart, another type of switching center called a "tandem" is also involved in establishing connectivity between two customers.

To satisfy various regulatory requirements, telephone carriers are classified as either "exchange carriers" (e.g., CLECs) or "interexchange carriers" (e.g. IXCs). Calls that span LATAs must use an IXC.

Reference will now be made in detail to the embodiments of the present invention, examples of which are illustrated in the accompanying drawings, wherein like reference numerals refer to like elements throughout. The embodiments are described below to explain the present invention by referring to the figures.

To perform the task of call setup and tear down (when multiple EOs are involved), switching offices communicate with each other using a signaling protocol referred to as SS7, carried over SS7 links. SS7 messages are used in specific sequences to perform various tasks required to establish telephone connections. SS7 messages are transported over a secure data network separate from the telephone call connection and referred to as the "SS7 network". At the heart of the SS7 network are packet switches known as STPs. STPs are deployed in pairs in the North American SS7 network to provide communication path redundancy. Different carriers own a portion of the SS7 network, and interconnect their EOs and tandems to the overall SS7 network to enable end-to-end communication between carriers SS7 messages consist of a message type and associated parameters. FIGS. 1A-1F illustrate the use of SS7 in the basic setup and tear down of telephone calls. For clarity of illustration, the configuration described in FIGS. 1A-1F only comprises two EOs. The example is intended for illustrative purposes only. Other switching points and communication lines could be involved in any given connection between two stations.

Figure 1B:
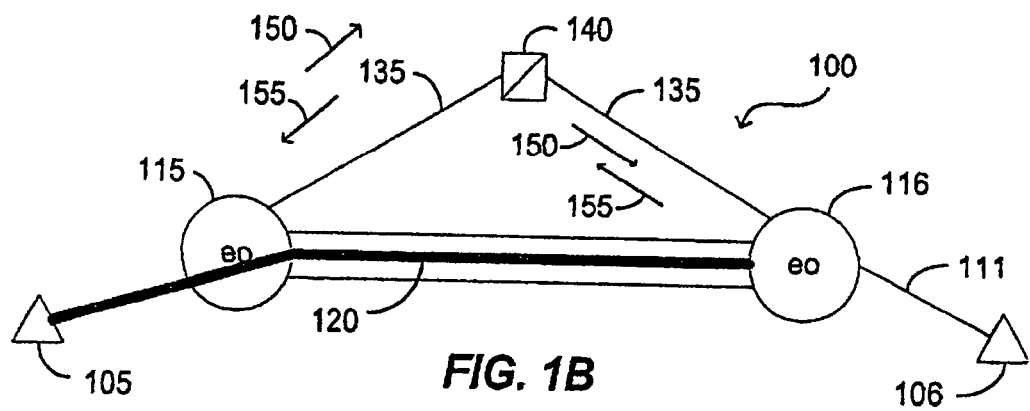
FIG. 1B is a diagram of the communication system in preparation for call connection according to an aspect of the present invention.
Figure 1C:
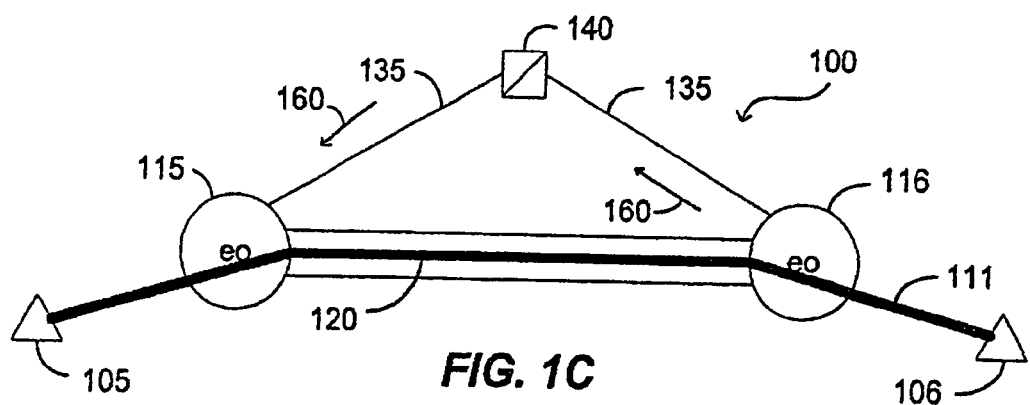
FIG. 1C is a diagram of the communication system with a call communication complete according to an aspect of the present invention.
Figure 1D:
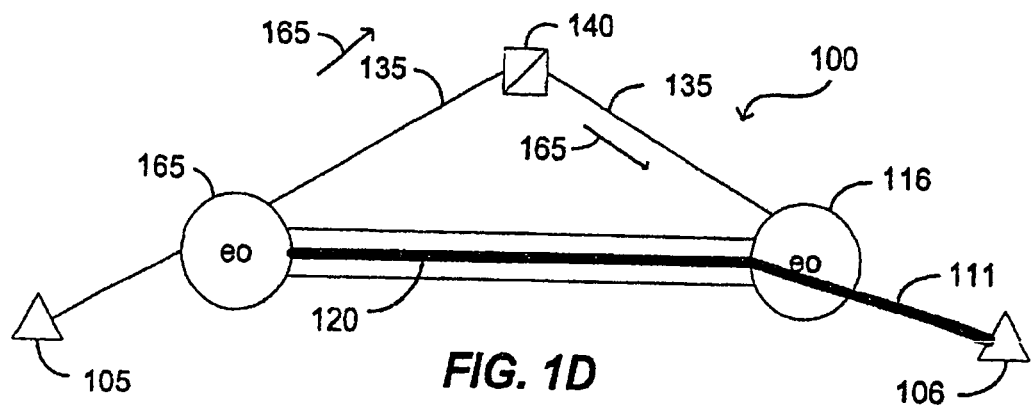
FIG. 1D is a diagram of the communication system with one party disconnected according to an aspect of the present invention.
Figure 1E:
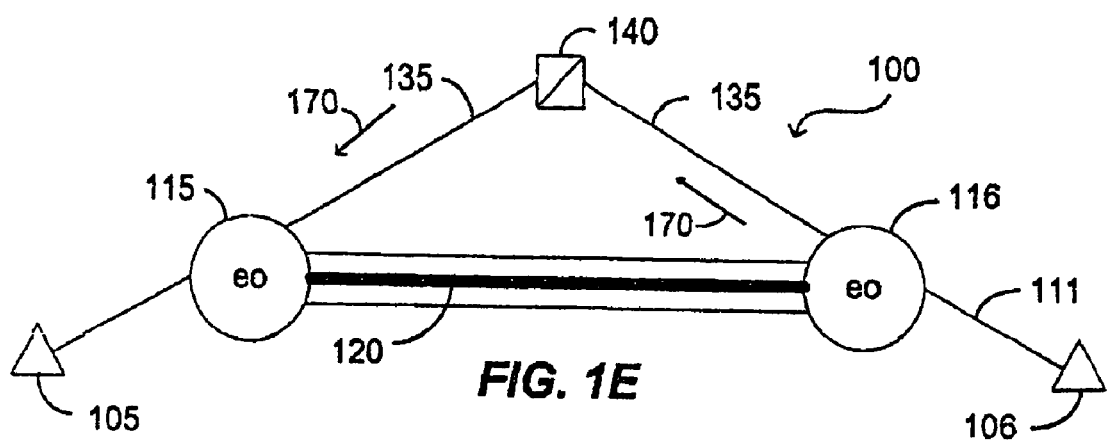
FIG. 1E is a diagram of the communication system immediately following last party disconnect according to an aspect of the present invention.
Figure 1F:
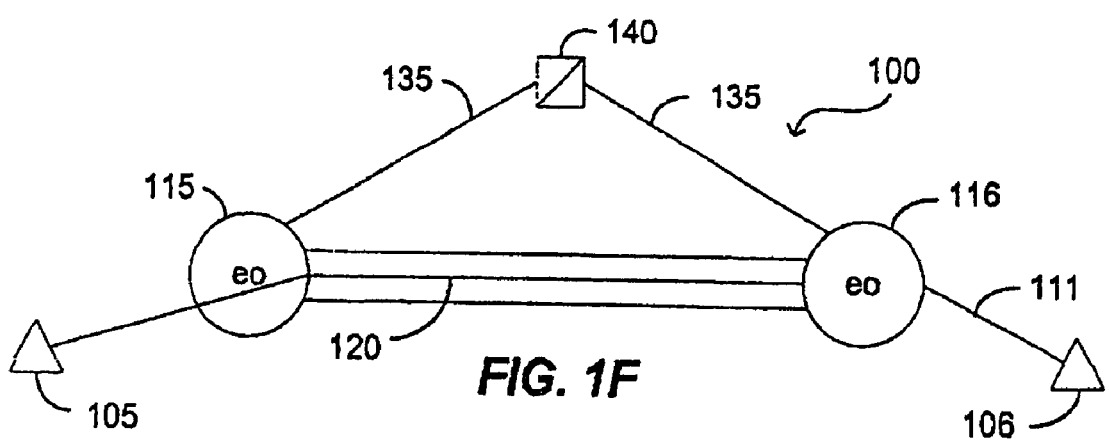
FIG. 1F is a diagram of the communication system after trunk release according to an aspect of the present invention.

FIG. 1A is a diagram of a telephone or communication system 100 according to an aspect of the present invention. FIG. 1B is a diagram of the telephone or communication system 100 in preparation for call connection according to an aspect of the present invention. FIG. 1C is a diagram of the telephone or communication system 100 with call connection complete according to an aspect of the present invention. FIG. 1D is a diagram of the telephone or communication system 100 with one party disconnected according to an aspect of the present invention. FIG. 1E is a diagram of the telephone or communication system 100 immediately following last party disconnect according to an aspect of the present invention. FIG. 1F is a diagram of the telephone or communication system 100 after trunk release according to an aspect of the present invention.

In FIG. 1A a first station 105, also referred to herein as a calling station 105 and as a calling telephone 105, is connected via a first loop 110 to a first switching office 115, also referred to herein as a first end office 115 and as a first EO 115. A second station 106 also referred to herein as a called station 106 and as a called telephone 106, is connected via a second loop 111 to a second switching office 116, also referred to herein as a second end office 116 and as a second EO 116. First and second switching offices 115,116 are connected to each other via a number of trunks 120. Two redundant signaling systems 130, form signal links 135, and transfer points 140. In modem telephone systems, signaling systems 130 are known as SS7 networks 130, signal links 135 are known as SS7 links 135, and transfer points 140 are known as STPs 140. For clarity, identifying numeral 130 is not shown in the FIG. 1A but is understood to include the aforementioned elements. As previously mentioned, one or both of the signaling systems 130 is used for the passing of messages necessary to complete a connection between the calling station 105 and the called station 106.

In FIGS. 1B-1F, one of the redundant signaling systems 130 has been removed to aid in clarity of illustration.

In FIG. 1B, a first message 150, which in the SS7 system 130 is referred to as an IAM 150 and also herein as a call initiation signal 150, is sent from the first switching office 115 via signal links 135 and transfer point 140 of signaling system 130 to the second switching office 116 to indicate the desire to set up a call. Trunk 120 is then seized by the first switching office 115 and "reserved" for use in the call. Connection between calling station 105 and first switching office 115 (i.e., first loop 110), as well as the trunk 120 seized to connect first and second switching offices 115,116, are indicated in FIG. 1B by bold lines. A second message 155, which in the SS7 system 130 is referred to as ACM 155, is sent from the second switching office 116 via signal links 135 and transfer point 140 of signaling system 130 to acknowledge receipt of the IAM 150 and to indicate that the called station 106 is being alerted (e.g., via ringing).

In FIG. 1C, a third message 160, which in the SS7 system 130 is referred to as ANM 160, is sent from the second switching office 116 via signal links 135 and transfer point 140 of signaling system 130 to the first switching office 115 to indicate when the called station 106 has answered. End-to-end connection is then established, and a conversation can take place. Connection between calling station 105 and first switching office 115 (i.e., first loop 110), between first and second switching offices 115,116 via the trunk 120, and between second switching office 116 (i.e., second loop 111) and called station 106 is indicated in FIG. 1C by bold lines.

In FIG. 1D, a fourth message 165, which in the SS7 system 130 is referred to as a REL 165, is sent from one of the switching offices, in this example the first switching office 115 via signal links 135 and transfer point 140 of signaling system 130 to the second switching office 116 to indicate that one of the parties, in this example calling station 105, has disconnected from the established communication link. In other words, the calling station 105 hung up. Connection between first and second switching offices 115,116 via the trunk 120 and between second switching office 116 (i.e., second loop 111) and called station 106 is indicated in FIG. 1D by bold lines.

In FIG. 1E, a fifth message 170, which in the SS7 system 130 is referred to as RLC 170, is sent from one of the switching offices, in this example the second switching office 116 via signal links 135 and transfer point 140 of signaling system 130 to the first switching office 115 to indicate that one of the parties, in this example called station 106, has disconnected from the established communication link. Again in other words, the called station 106 hung up. Connection between first and second switching offices 115,116 via the trunk 120 is indicated in FIG. 1E by bold lines. At that point the trunk 120 is released as indicated in FIG. 1F.

Figure 2:
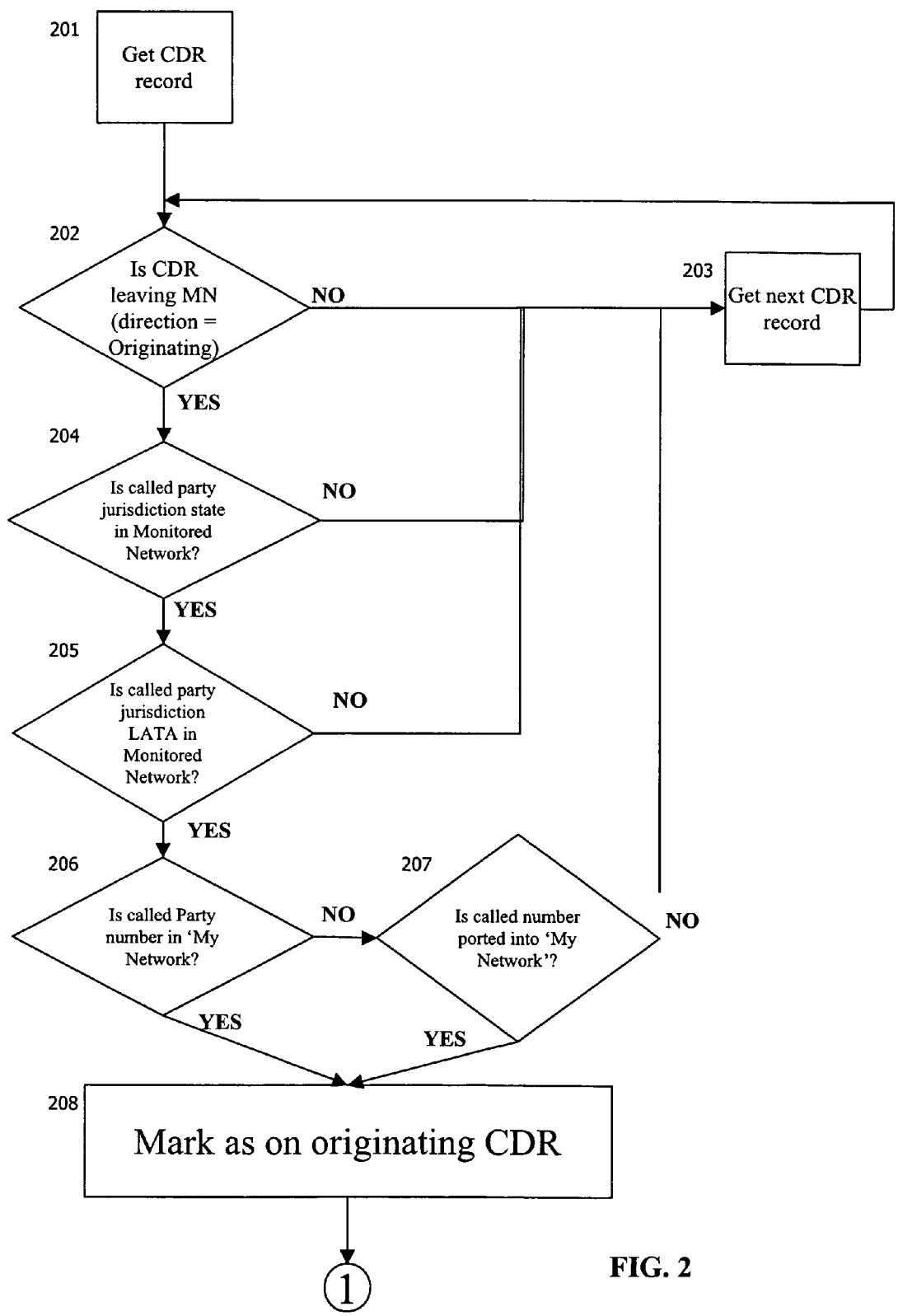
FIG. 2 is a flow chart illustrating the process of identifying originating CDRs according to an aspect of the present invention.

FIG. 2 is a flow chart illustrating the process of identifying originating CDRs according to an aspect of the present invention. Referring now to FIG. 2, at operation 201, a CDR record is retrieved from all the CDRs stored in a database (not shown). At operation 202, it is determined whether the CDR is originating, i.e. is leaving the monitored network (MN). If determined that the CDR is not originating, then a next CDR is retrieved from the database, as illustrated at operation 203. However, if determined that the CDR is originating, it is determined whether the called party jurisdiction state is in the MN at operation 204. After determining, at operation 204, that the called party jurisdiction state is in the MN, at operation 205, it is determined whether the called party jurisdiction LATA is in the MN. If the called party jurisdiction LATA is not in the MN, the process returns to retrieving a next CDR from the database as illustrated in operation 203. However, if the called party jurisdiction is in the LATA MN, the process proceeds to determining whether the called party number is in the MN, as illustrated at operation 206. If the called party number is in the MN, the CDR gets marked as an originating CDR (ORIG CDR). Alternatively, if the called party number is not in the MN, then at operation 207, it is determined whether the called number is ported into the MN. If determined that the called number is ported into the MN, the CDR is marked as an ORIG CDR, as illustrated in operation 208.

Figure 3:
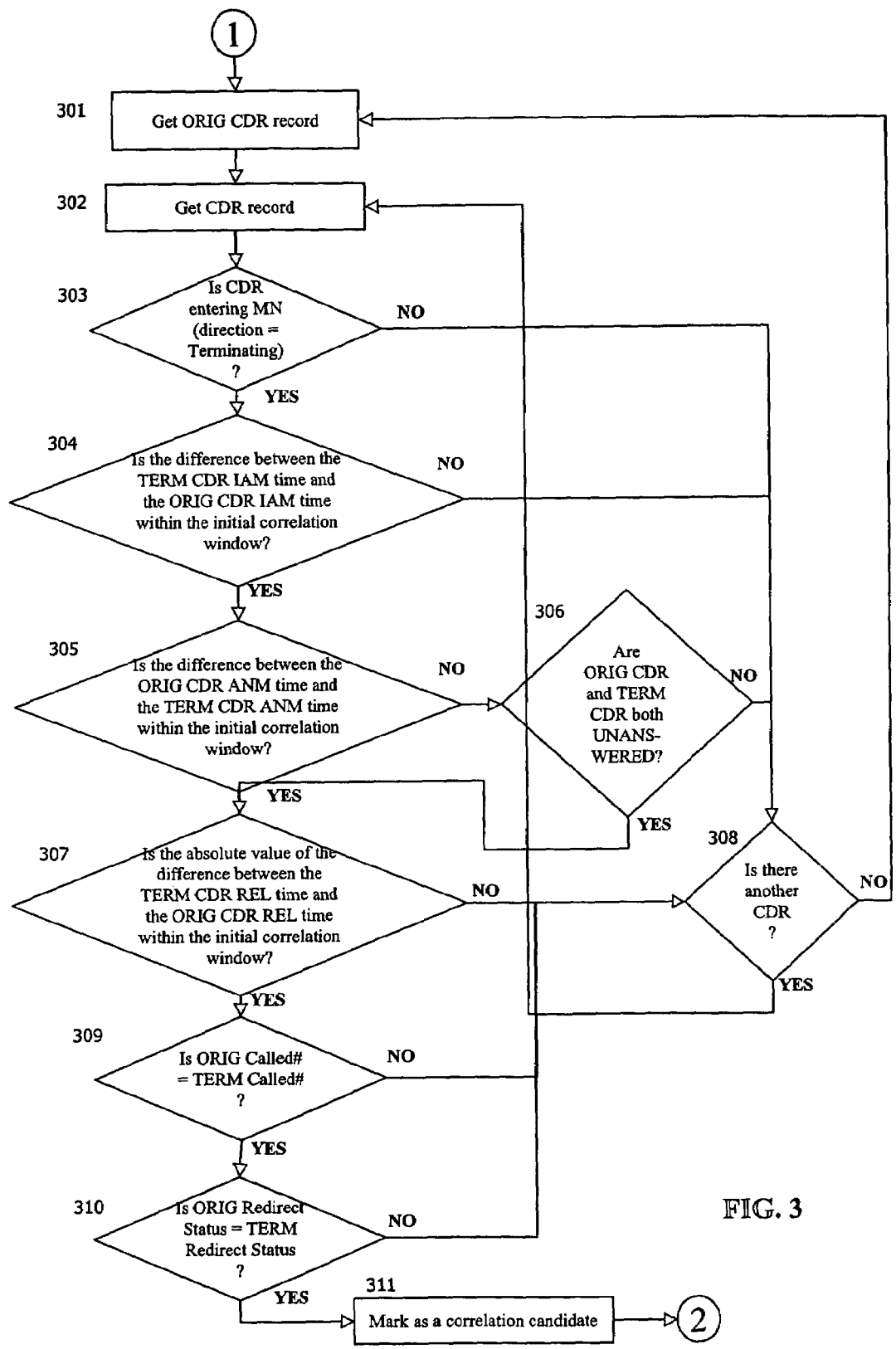
FIG. 3 is a flow chart illustrating a process of identifying correlation candidates according to an aspect of the present invention.

FIG. 3 is a flow chart illustrating a process of identifying correlation candidates according to an aspect of the present invention. At operations 301 and 302, an ORIG CDR and a CDR are retrieved from the database. At operation 303 it is determined whether the CDR is terminating, i.e. entering the MN. If determined that the CDR is terminating, the CDR is marked as a terminating CDR (TERM CDR). At operation 304, it is determined whether a difference between the TERM CDR IAM time and an ORIG CDR IAM time are within an initial correlation window. If at operation 303, it is determined that the CDR is not terminating, then another CDR is retrieved from the database and compared with the ORIG CDR.

At operation 305, it is determined whether the difference between an ORIG CDR ANM time and a TERM CDR ANM time are within the correlation window. If the difference between the ORIG CDR ANM time and the TERM CDR ANM time are not within the initial correlation window, then at operation 306, it is determined whether the ORIG CDR and TERM CDR are both unanswered. If both the ORIG CDR and the TERM CDR are not both unanswered, then another CDR is searched for in the database as illustrated at operation 308.

At operation 307, it is determined whether an absolute value of the difference between a TERM CDR REL time and an ORIG CDR REL time are within the initial correlation window. If the absolute value is not within the initial correlation window, another CDR is searched from the database as illustrated at operation 308. If determined that the absolute value of the TERM CDR REL and the ORIG CDR REL is within the initial correlation window, the process continues to operation 309. At operation 309 it is determined whether the ORIG CDR called number and the TERM CDR called number are the same. If so, it is then determined whether the ORIG CDR redirect status is equal to the TERM CDR redirect status, as illustrated at operation 310. If not, another CDR is retrieved from the database as illustrated at operation 308. If at operation 310, it is determined that the ORIG CDR redirect status is equal to the TERM CDR redirect status, the records are marked as a correlation candidate, as illustrated at operation 311.

Figure 4A:
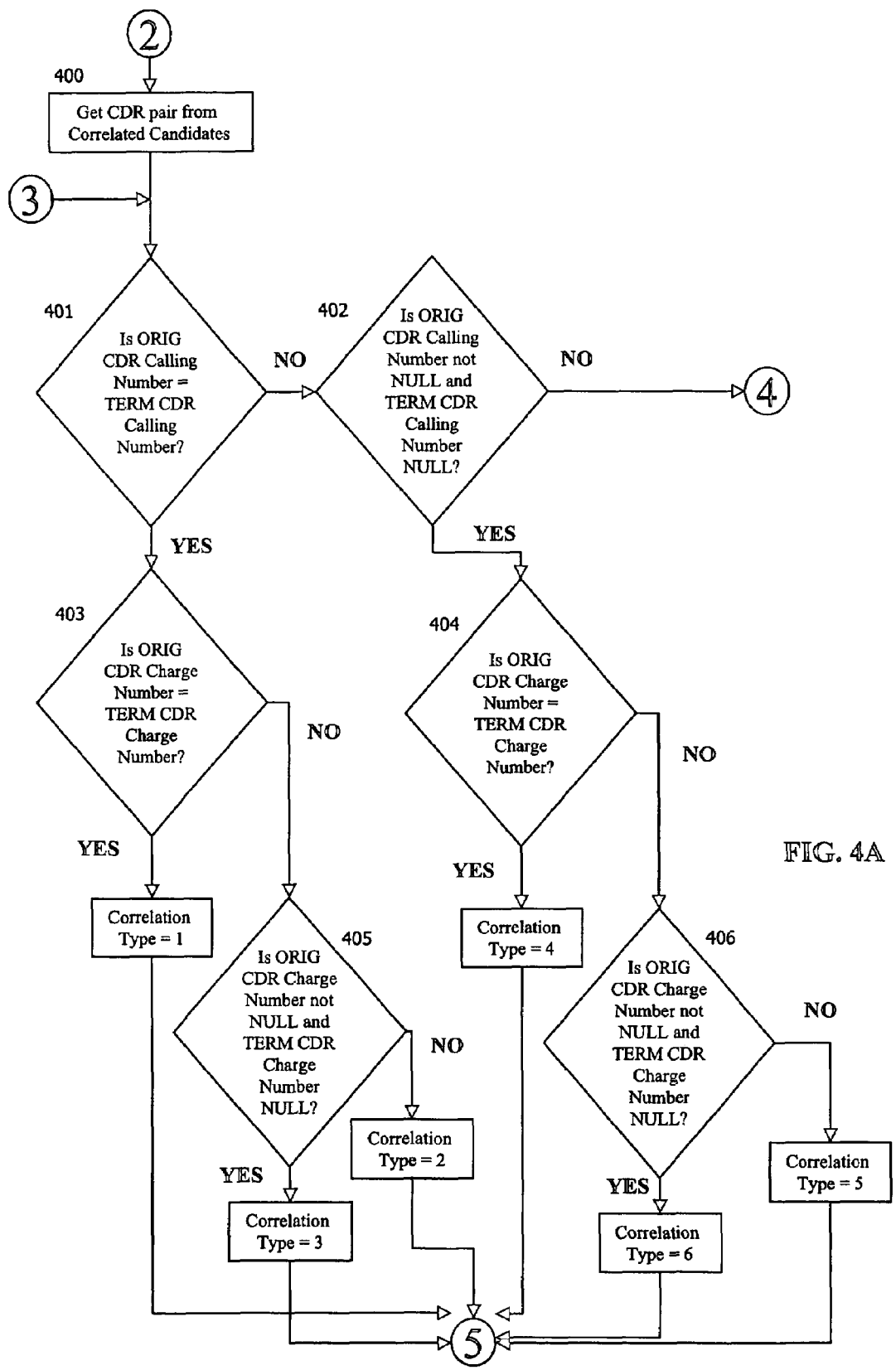
FIG. 4A is a flow chart illustrating a process of setting correlation types for all the correlation candidates according to another aspect of the present invention.

FIG. 4A is a flow chart illustrating a process of setting correlation types for all the correlation candidates according to another aspect of the present invention. The assignment of a correlation type for each correlation candidate provides the ability to segregate the methods by which the originating and terminating CDRs are correlated thereby simplifying the identification of arbitrage. Referring to FIG. 4A, at operation 400, a CDR pair from the correlation candidates is retrieved from the database (not shown), and it is determined whether the ORIG CDR calling number is equal to the TERM CDR calling number at operation 401. If the calling numbers are not the same, the process continues to operation 402, where it is determined whether the ORIG CDR calling number is not NULL and the TERM CDR calling number is NULL. If the ORIG CDR calling number is the same as the TERM CDR calling number the process continues to operation 403. At operation 403, it is determined whether the ORIG CDR charge number is equal to the TERM CDR charge number. If the charged numbers are the same, the correlation candidates are set to a type 1 correlation. If the charge numbers are not the same, then at operation 405 it is determined whether the ORIG CDR charge number is not NULL and the TERM CDR charge number is NULL. If determined that the ORIG CDR charge number is not NULL and the TERM CDR charge number is NULL, the correlation candidates are set to a type 3 correlation. If the above determination is negative, the correlation candidates are set to a type 2 correlation.

If at operation 402, it is determined that the ORIG CDR calling number is not NULL and the TERM CDR calling number is NULL, the process continues to operation 404. At operation 404, it is determined whether the ORIG CDR charge number is equal to the TERM CDR charge number. If both numbers are equal, then at operation 404, the correlation candidates are set to a type 4 correlation. If both numbers are determined not to be equal the process proceeds to operation 406. At operation 406 it is determined whether the ORIG CDR charge number is not NULL and the TERM CDR charge number is NULL. If the determination at operation 406 is yes, the correlation candidates are set to a type 6 correlation and if the determination is no, the correlation candidates are set to a type 5 correlation.

Figure 4B:
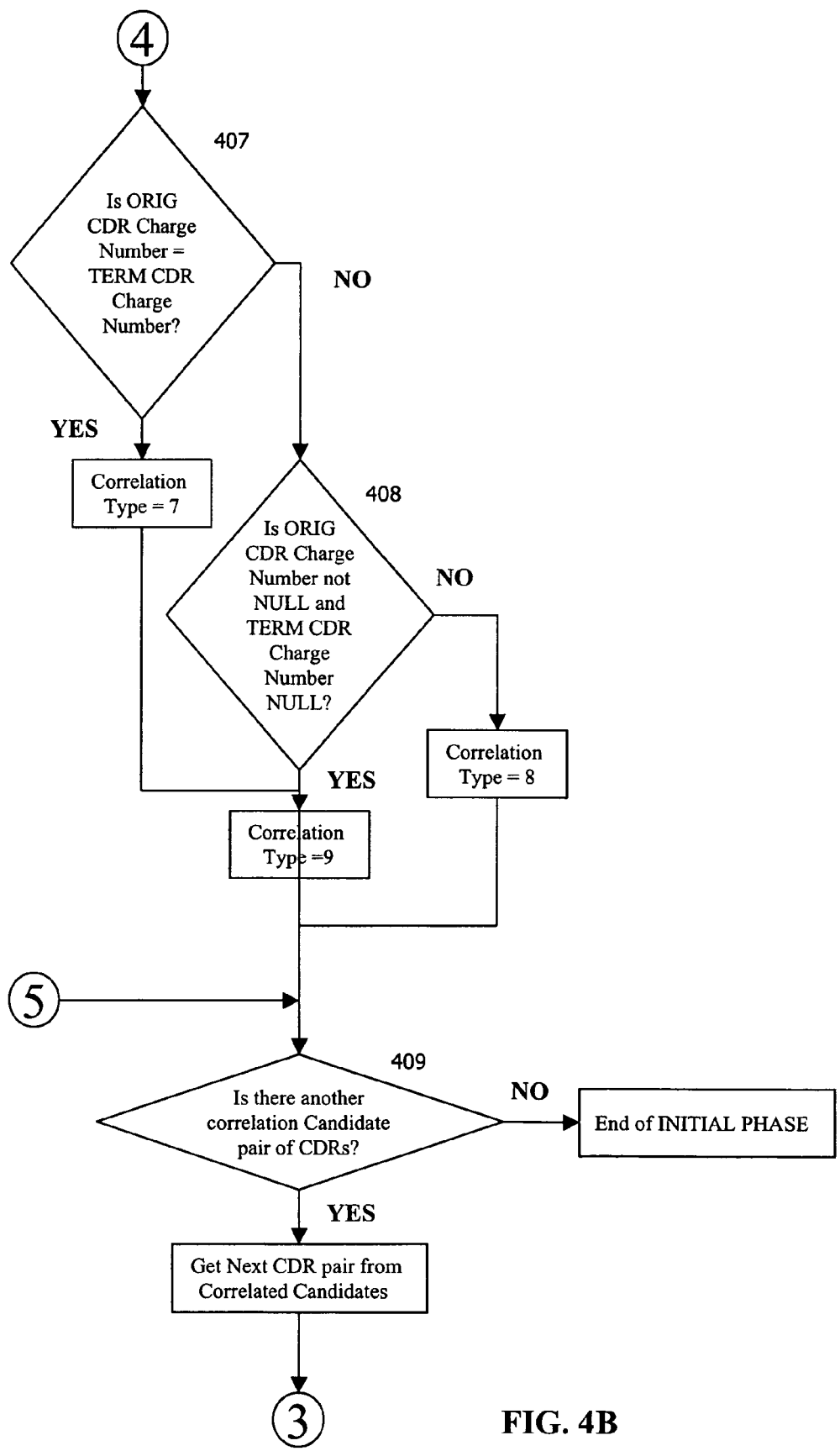
FIG. 4B is a flow chart illustrating setting correlation types for all correlation candidates according to an aspect of the present invention.

FIG. 4B is a flow chart illustrating setting correlation types for all correlation candidates according to an aspect of the present invention. Referring to FIG. 4B, if the determination of operation 402 is no, then, at operation 407, it is determined whether the ORIG CDR charge number is equal to the TERM CDR charge number. If so, the correlation candidates are determined to be type 7. If the determination at operation 407 is no, at operation 408, it is determined whether the ORIG CDR charge number is not NULL and the TERM CDR charge number is NULL. If the determination of operation 408 is yes, the correlation candidates are determined to be type 9 and if the determination of operation 408 is no, the correlation candidates are determined to be type 8.

Once all the correlation types have been set, at operation 409, it is determined whether there is another correlation candidate pair of CDRs, if no, the initial phase ends. If another correlation candidate pair exists, a next CDR pair from the correlated candidates is obtained and the process continues from operation 401.

Figure 5:
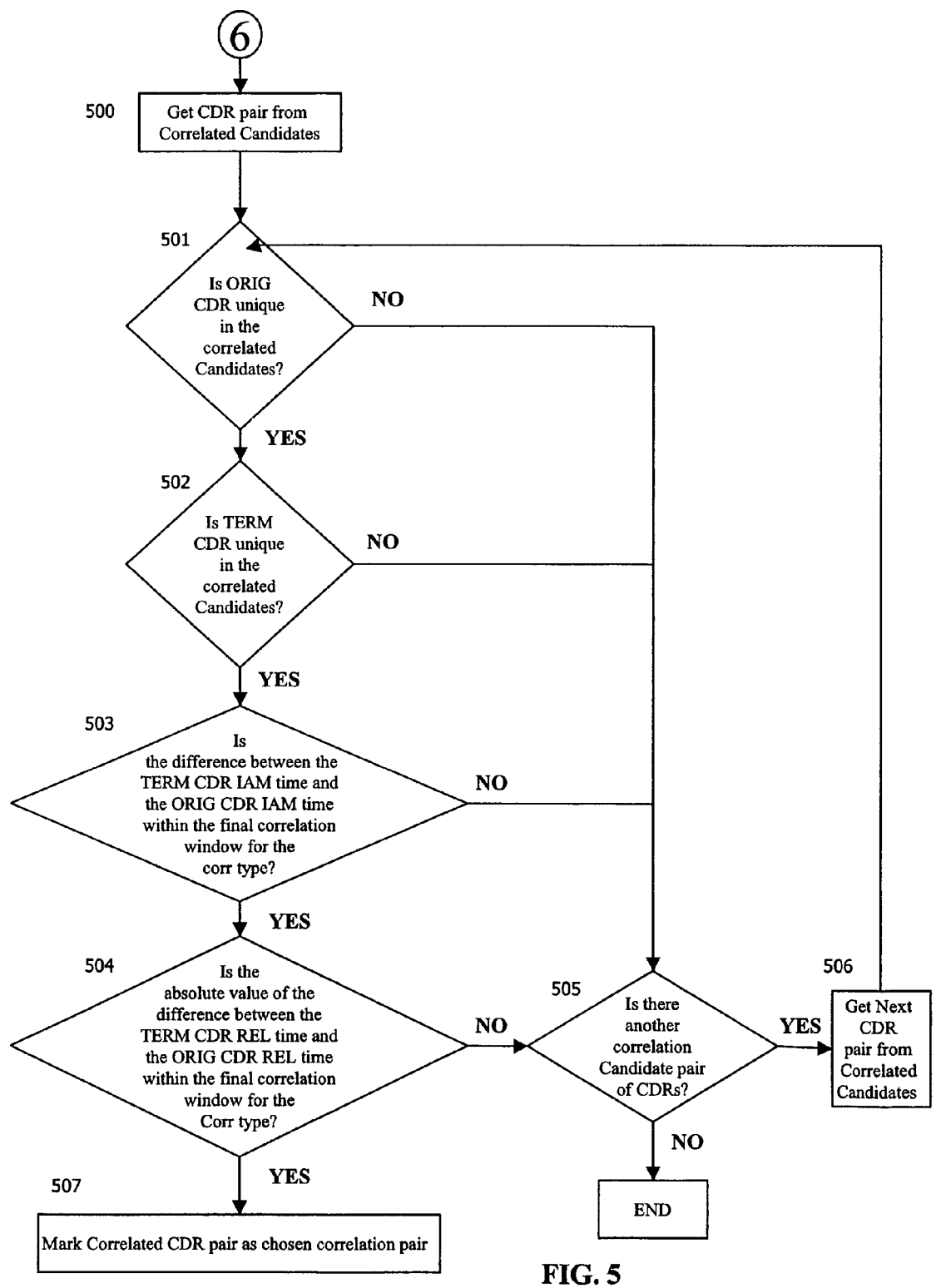
FIG. 5 is a flow chart illustrating a process of identifying a chosen correlation pair according to an aspect of the present invention.

FIG. 5 is a flow chart illustrating a process of identifying a chosen correlation pair according to an aspect of the present invention. Referring to FIG. 5, a CDR pair from the correlated candidates is retrieved from the database as illustrated at operation 500. Thereafter, at operation 501, it is determined whether the ORIG CDR is unique in the correlated candidates. If the ORIG CDR is not unique, the process proceeds to operation 505. At operation 505, it is determined whether another correlation candidate pair of CDRs exists. If another correlation candidate pair exists, a next CDR pair from the correlated candidates is retrieved, as illustrated at operation 506. If there is no other correlation candidate pair of CDRs, the process terminates.

Referring back to operation 501, if determined that the ORIG CDR is unique, the process proceeds to operation 502. At operation 502, a determination is made as to whether a TERM CDR is unique in the correlated candidates. If the TERM CDR is not unique the process continues to operation 505. On the other hand, if determined that the TERM CDR is unique the process continues to operation 503. At operation 503, it is determined whether a difference between the TERM CDR IAM time and the ORIG CDR IAM time are within a final correlation window for the correlation type. If the difference between the TERM CDR IAM time and the ORIG CDR IAM time are not within the final correlation window for the correlation type, the process continues to operation 505, where another correlation candidate pair of CDRs is searched.

On the other hand, if the difference between the TERM CDR IAM time and the ORIG CDR IAM time is within the final correlation window, the process continues to operation 504. At operation 504 it is determined whether the absolute value of a difference between the TERM CDR REL time and the ORIG CDR REL time is within the final correlation window for the correlation type. If the absolute value is not within the final correlation window, the process continues to operation 505, where a determination is made of whether another correlation candidate pair of CDR exists. If the absolute value is within the final correlation window, the correlated CDR pair is chosen as a correlation pair, as illustrated at operation 507.

Thereafter, CDR fields of the ORIG CDR and TERM CDR in the unique correlated pairs are compared. Fields compared may include, for example, trunk types (access, local), billing jurisdiction (intrastate, local), routing carrier (IXC A, CLEC C), calling number, charge number, and other types of information. These CDR fields may indicate suspect arbitrage activity when they differ between the ORIG CDR and the TERM CDR. Accordingly, based on the comparison of the CDR fields of the unique correlated pairs, arbitrage may be identified.

Figure 6:
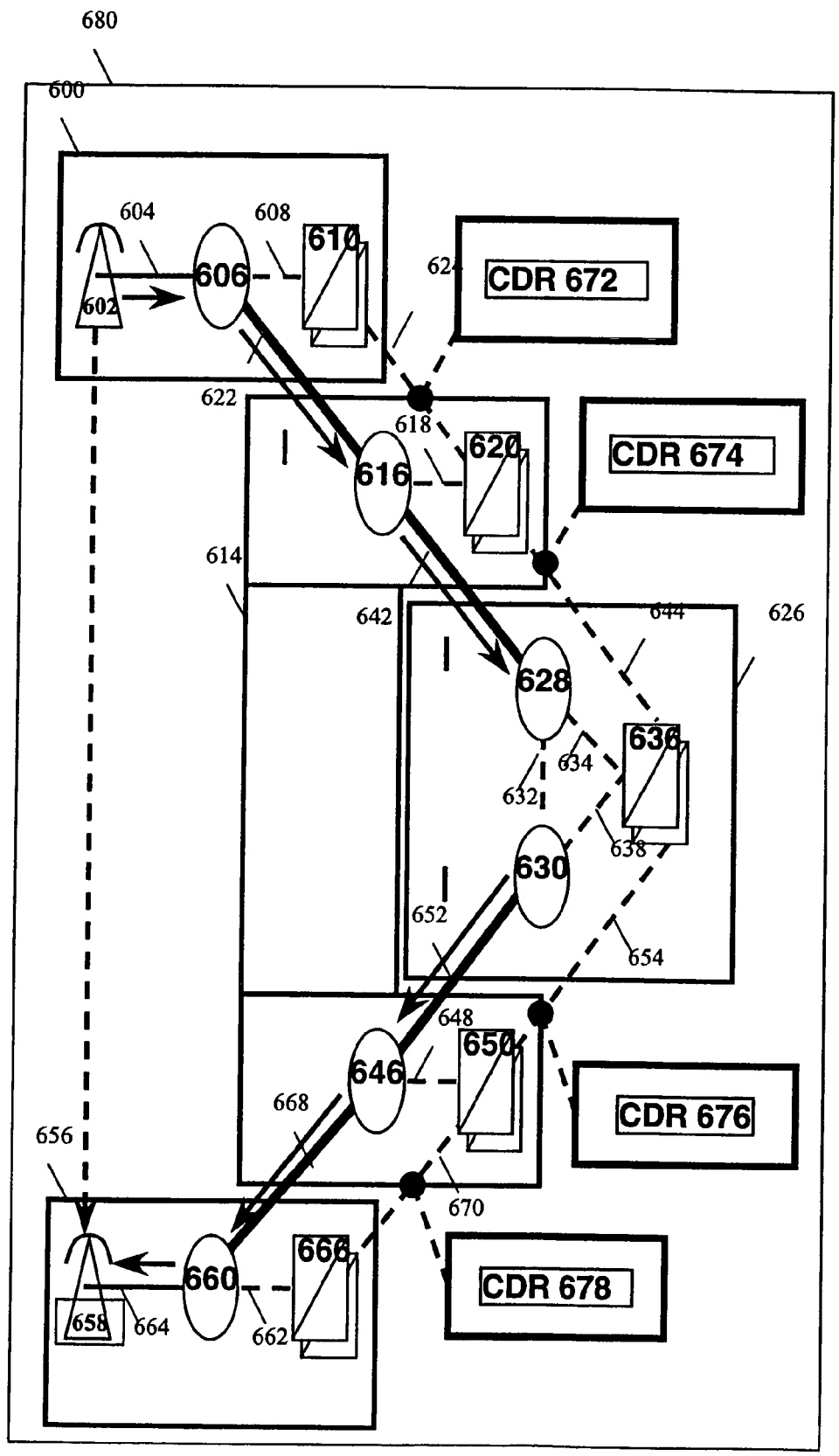
FIG. 6 is a diagram of a call route through a communication system according to an aspect of the present invention.

FIG. 6 is a diagram of a telephone or communication system 680 according to an aspect of the present invention. System 680 is comprised of four distinct telephone networks connected together via signaling links and switching system trunks. For certain correlation processes, a correlated set of CDRs can include more than an ORIG CDR and a TERM CDR. FIG. 6 illustrates an example of a call route that results in four CDRs within the correlated set.

In FIG. 6, a first network 600 includes a first station 602, herein referred to as calling station 602 or as a calling telephone 602, that is connected via a first loop 604 to a first switching office 606 that is connected to two redundant transfer points 610 via signaling links 608. A second network 614, herein also referred to as monitored network 614, includes a second switching office 616 connected to two redundant transfer points 620 via signaling links 618 and a fifth switching office 646 connected to two redundant transfer points 650 via signaling links 648. Second switching office 616 is connected via a set of trunks 622 to first switching office 606 in the first network 600 and via a set of trunks 642 to a third switching office 628 in a third network 626. Transfer points 620 in the second network 614 are connected to transfer points 610 in the first network 600 via signaling links 624.

Continuing to refer to FIG. 6, third network 626 includes a third switching office 628 connected to two redundant transfer points 636 via signaling links 634 and a fourth switching office 630 connected to transfer points 636 via signaling links 638. Third switching office 628 and fourth switching office 630 are connected together via trunks 632. Fourth switching office 630 is connected to the second network 614 via trunks 652 and transfer points 636 are connected to transfer points 650 of the second network via signaling links 654. A fourth and last network 656 includes a second station 658, herein referred to as either called station 658 or called phone 658, connected via loop 664 to a sixth switching office 660 which is connected to two redundant transfer points 666 via signaling links 662. Fourth network 656 is connected to the second network 614 via trunks 668 connecting sixth switching office 660 and fifth switching office 646, and via signaling links 670 connecting transfer points 650 and transfer points 666.

Continuing to further refer to FIG. 6, calling station 602 places a call to the called station 658. The call traverses from network 600, which serves the calling station 602, to the monitored network 614 to third network 626 back to monitored network 614 and finally to fourth network 656 which serves the called station 658. Monitored network 614 creates CDR 672 as the call is observed on signaling links 624 which are associated with the call as it enters monitored network 614 from network 600. A second CDR 674 is created in monitored network 614 as the call is observed on signaling links 644 leaving monitored network 614 for third network 626. A third CDR 676 is created in monitored network 614 as the call is observed on signaling links 654 re-entering monitored network 614. A fourth and final CDR 678 is created by monitored network 614 as the call is observed on signaling links 670 leaving monitored network 614 for fourth network 656. From the example illustrated in FIG. 6, in accordance with an aspect of the present invention, a compound CDR is created which includes call record elements from CDR 672, CDR 674, CDR 676, and CDR 678 in the listed order.

Figure 7:
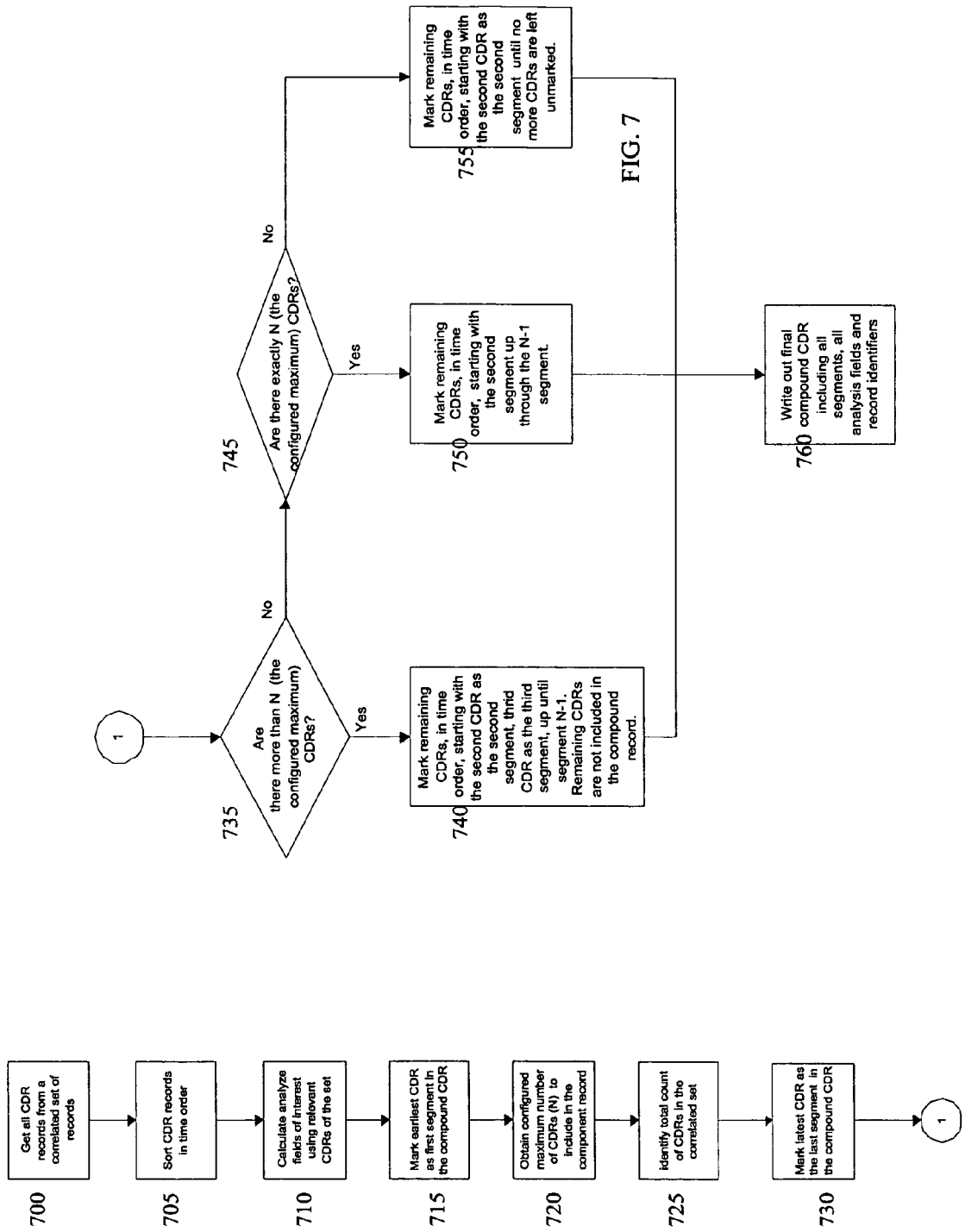
FIG. 7 is a flow chart illustrating the process of organizing call detail records and writing compound call detail records according to an aspect of the present invention.

FIG. 7 is a flow chart illustrating a process of joining the individual CDRs of a correlated set of calls into a compound CDR according to an aspect of the present invention. At operation 700, all CDRs associated with a correlation set are obtained. At operation 705 the CDRs are ordered by time. According to an aspect of the present invention, the CDRs are ordered in increased time by IAM timestamp. At operation 710 additional enrichment is performed for the compound CDR based on comparing fields of one CDR of the correlated set to fields of another CDR of the correlated set. At operation 715, the earliest CDR (e.g. CDR 672 (FIG. 6)) is marked as the first segment of the compound CDR and the last CDR (e.g. CDR 678 (FIG. 6)) is marked as the last segment of the compound CDR. At operation 725 the total number of CDRs in the correlated set is determined and stored as "total_legs". At operation 730, the configured maximum number of call segments desired for the created compound CDR is obtained and stored as "max_segments".

Continuing to refer to FIG. 7, a comparison is made between "total_legs" and "max_segments" at operations 735 and 740. If, at operations 735 and 740, "total_legs" is less than "max_segments", all remaining CDRs are marked, in time order, starting with the second CDR (e.g. CDR 674 (FIG. 6))

as segment 2, the third CDR (e.g. CDR 674 (FIG. 6)) as segment 3, etc. until all CDRs are assigned a segment number. Remaining segment numbers are assigned a NULL value. If, at operations 735 and 740, "total_legs" is equal to "max_segments", all remaining CDRs are marked, in time order, starting with the second CDR as segment 2, the third CDR as segment 3, etc. If, at operations 735 and 740, "total_legs" is greater than "max_segments", remaining CDRs are marked, in time order, starting with the second CDR as segment 2 until the max_segment-1 segment is reached. All other CDRs not assigned a segment number can be discarded.

Continuing to still further refer to FIG. 7, at operation 760 the compound CDR is created, which includes all configured fields of each segment (field names prepended with the segment_number), all analysis fields calculated at operation 710, and any record identifiers which include, but are not limited to, compound call record number and creation date. The entire flow chart in FIG. 7 is to be repeated for each set of correlated CDRs, in accordance with an aspect of the present invention.

FIG. 8 illustrates the construction of compound CDR 811. CDR #1 813 through CDR#n 827 are identified via a unique identifier, also referred to as a correlation_id 829. The same unique correlation_id 829 was previously assigned to every CDR in correlated set 812 by a correlation operation such as, but not limited to, the operation described above. In constructing each compound CDR 811, all CDRs with the same correlation_id 829 are grouped and processed together in the operations illustrated in FIG. 8. Once all CDRs in a single correlated set 812 have been grouped, duplicate CDRs are rejected and the remaining non-duplicate CDRs are sorted by increasing high accuracy IAM time. The sorted correlated set 812 is then numbered from 1 to N with 1 being the earliest CDR and N being the latest CDR. At operation 800, fields of all correlated CDRs are analyzed for creation of enriched characteristics of the correlated set 812 of CDRs. Possible enrichments are discussed below. At operation 805, the earliest CDR, CDR #1 813, of correlated set 812 is marked as segment 1 814 and selected fields of the CDR are prepended with "S1_" and entered into compound CDR 811. Likewise, at operation 830, the last CDR, CDR #6 824 of the correlated set 812 is marked as the last segment, segment 6 826, of compound CDR 811. In this example, compound CDR 811 is configured to include only six segments so selected fields of CDR #6 824 are prepended with "S6_" and entered into compound CDR 811. If additional CDRs are present in correlation set 812, then at operation 810, the second CDR, CDR #2 817, of correlated set 812 is marked as segment 2 816 and selected fields of the CDR are prepended with "S2_" and entered into the compound CDR. If additional CDRs are not present in correlated set 812, then at operation 810, the segment 2 816 fields will be NULL.

Continuing to still further refer to FIG. 8, if additional CDRs are present in the correlated set, then at operation 815, the third CDR, CDR #3 819 of correlated set 812 is marked as segment 3 818 and selected fields of the CDR are prepended with "S3_" and entered into compound CDR 811. If additional CDRs are not present in correlated set 812, then at operation 815, segment 3 818 fields will be NULL. If additional CDRs are present in correlated set 812, then at operation 820, the fourth CDR, CDR #4 821, of correlated set 812 is marked as segment 4 822 and selected fields of the CDR are prepended with "S4_" and entered into compound CDR 811. If additional CDRs are not present in correlated set 812, then at operation 820, segment 4 822 fields will be NULL.

Continuing to refer to FIG. 8, if additional CDRs are present in correlated set 812, then at operation 825, the fifth CDR, CDR #5 823, of correlated set 812 is marked as segment 5 824 and selected fields of the CDR are prepended with "S5_" and entered into compound CDR 811. If additional CDRs are not present in correlated set 812, then at operation 825, segment 5 824 fields will be NULL. If additional CDRs, not already assigned a segment number, are in correlated set 812, they are not included in compound CDR 811. At operation 835, the calculated analysis fields 837 are added to compound CDR 811, performing the function of enrichment. In addition, at operation 840, additional identifiers, in addition to correlation ID 829, of compound CDR 811 are appended to compound CDR 811 resulting in a completed, enriched compound CDR 811.

Continuing to refer to FIG. 8, one possible enrichment is a field to identify the total number of CDRs contained within the original correlated set 812 of CDRs. For example, compound CDR 811 may be configured to only hold six segments but there may be seven CDRs in correlated set 812. Another possible enrichment is a field that identifies the direction of the various call paths associated with the various CDRs in correlation set 812, in reference to monitored network 614 (FIG. 6) and in increasing time order. For example, a CDR representing a call path that leaves monitored network 614 is considered an originating CDR. A CDR representing a call path that enters monitored network 614 is considered a terminating CDR. So, if correlated set 812 of CDRs includes an originating CDR followed by a terminating CDR followed by another originating CDR, the direction route would be 'OTO'. Another possible enrichment is a field that identifies when two adjacent CDRs in a time ordered correlated set 812 of CDRs have the same direction: either two originating legs or two terminating legs. This would assist network analysts to identify where they may have network routing problems and/or monitoring errors. Another possible enrichment is a field that identifies the count of occurrences of the most frequently observed point code within correlated set 812 of CDRs. This could be used by network analysts to identify potential circular routing conditions.

Continuing to still further refer to FIG. 8, additional enrichment is possible to aid in identifying suspect arbitrage. Such enrichments could include, but are not limited to, a comparison of fields from the segment 1 814 to the same fields in the last segment, segment 6 818, and recording the results of the comparison. The results could be always null, same, inserted, removed, or altered. Example fields could include, but are not limited to, calling party number, charge party number, jurisdiction parameter, call category/jurisdiction. Additional suspect arbitrage enrichment could include identification of a re-entry point, i.e. the point where the call leaves monitored network 614 (FIG. 6) and later returns. Fields could include the outbound segment number, inbound segment number, a re-entry flag, the difference in IAM time at the re-entry point, the difference in ANM time at the re-entry point, and the difference in REL time at the re-entry point. Additional suspect arbitrage enrichment could include a flag for each suspect arbitrage scenario. One such suspect arbitrage scenario could be when a call leaves monitored network 614 for an IXC and later returns to monitored network 614 via a CLEC with an altered charge party number and a removed calling party number.

Although a few embodiments of the present invention have been shown and described, it would be appreciated by those skilled in the art that changes may be made in this aspect without departing from the principles and spirit of the invention, the scope of which is defined in the claims and their equivalents.

What is claimed is:

1. A method for preparing call data for analysis comprising the steps of:
   joining individual Call Detail Records (CDRs) from a correlated set of calls into a compound CDR;
   enriching the compound CDR based on comparing fields of the individual CDRs;

ordering the individual CDRs that make up the enriched compound CDR by time;

marking the individual CDRs with correlation identifiers associated with the time order of the individual CDRs; and saving the ordered, enriched compound CDR.

2. The method of claim 1 further comprising the step of:
ordering the individual CDRs by increased time according to IAM timestamp.

3. The method of claim 1 further comprising the steps of:
identifying and marking an initial individual CDR; and
identifying and marking a final individual CDR.

4. The method of claim 1 further comprising the steps of:
computing a total number of ordered CDRs in the compound CDR;
comparing the total number of ordered CDRs in the compound CDR with a preselected maximum number of CDRs; and
deleting from the total number of CDRs a number of ordered CDRs that is greater than the preselected maximum number of CDRs.

5. The method of claim 1 further comprising the step of:
creating the correlated set of CDRs.

6. The method of claim 5 wherein said step of creating the correlated set (812) comprises the steps of:
determining originating CDRs and terminating CDRs;
determining whether the originating CDRs and the terminating CDRs are correlated;
obtaining correlated candidate pairs from the determined correlated CDRs;
establishing whether a correlated candidate pair of the obtained correlated candidate pairs is unique within the obtained correlated candidate pairs; and
adding the unique pair to the correlated set of CDRs.

7. The method of claim 6 wherein said step of determining the originating CDRs comprises the steps of:
obtaining a CDR;
determining whether a call associated with the CDR is leaving a monitored network (MN); and
determining whether a called party jurisdictional state associated with the CDR is in the MN.

8. The method of claim 6 said step of determining the originating CDRs further comprises the step of:
determining if a called party jurisdiction Local Access Transport Area (LATA) and a called party number associated with the CDR are in the MN.

9. The method of claim 6 said step of determining the originating CDRs further comprises the step of:
determining if a called party number associated with the CDR is ported into the MN.

10. The method of claim 6 further comprising the step of:
marking the CDRs as originating CDRs if a called party number associated with the CDR is in the MN.

11. The method of claim 6 wherein said step of obtaining the correlated candidate pairs comprises the steps of:
selecting a preselected CDR from the originating CDRs;
comparing the preselected CDR with an individual CDR from the compound CDR; and
determining whether a call associated with the preselected CDR and the individual CDR is entering the MN.

12. The method of claim 6 wherein said step of obtaining the correlated candidate pairs comprises the step of:
determining whether a difference between a terminating CDR Initial Address Message (IAM) time and an originating CDR IAM time are within a preselected correlation window.

13. The method of claim 6 wherein said step of obtaining the correlated candidate pairs comprises the step of:
determining whether a difference between an originating CDR Answer Message (ANM) time and a terminating CDR ANM time are within a preselected correlation window.

14. The method of claim 6 wherein said step of obtaining the correlated candidate pairs comprises the step of:
determining whether a difference between a terminating CDR Release Message (REL) time and an originating CDR REL time are within a preselected correlation window.

15. The method of claim 6 wherein said step of obtaining the correlated candidate pairs comprises the step of:
determining whether an originating called number is the same as a terminating called number.

16. The method of claim 6 wherein said step of obtaining the correlated candidate pairs comprises the step of:
determining whether an originating redirect status is the same as a terminating redirect status.

17. A system for processing Call Detail Records (CDRs) to save the CDRs for analyzing call routing comprising:
means for joining individual CDRs from a correlated set of calls into a compound CDR;
means for enriching said compound CDR based on comparing fields of said individual CDRs;
means for ordering said individual CDRs that make up said enriched compound CDR by time;
means for marking said ordered individual CDRs with correlation identifiers associated with the time order of the ordered individual CDRs; and
means for saving said ordered, enriched, compound CDR.

18. A system for creating an enriched compound Call Detail Record (CDR) comprising:
means for identifying CDRs according to a correlation identifier from a correlated set;
means for sorting said CDRs in time order;
means for concatenating said sorted CDRs into a compound CDR; and
means for enriching said compound CDR.

19. The system of claim 18 further comprising:
means for determining duplicate CDRs from said correlated set; and
means for removing said duplicate CDRs prior to executing said means for ordering.

20. The system of claim 18 wherein said means for enriching comprises:
means for comparing a first field associated with a first CDR in said correlated set to a last field associated with a last CDR in said correlated set.

21. The system of claim 18 wherein said means for enriching comprises:
means for computing a total number of CDRs in said correlated set.

22. The system of claim 18 wherein said means for enriching comprises:
means for flagging a missing CDR leg is said compound CDR.

23. The system of claim 18 wherein said means for enriching comprises:
means for flagging at least one arbitrage scenario in said compound CDR.

\* \* \* \* \*